United States Patent [19]

Guerrant

[11] Patent Number: 5,416,542
[45] Date of Patent: May 16, 1995

[54] APPARATUS FOR USE IN PROJECTING A PICTURE IMAGE ONTO A REMOTE SURFACE

[76] Inventor: George H. Guerrant, 2901-A Loring Dr., Loring AFB, Me. 04751

[21] Appl. No.: 235,898

[22] Filed: May 2, 1994

[51] Int. Cl.6 .............................................. G03B 21/14
[52] U.S. Cl. ...................................... 353/120; 353/25; 353/DIG. 5
[58] Field of Search .......... 353/120, DIG. 3, DIG. 5, 353/119, 27 R, 25, 108

[56] References Cited

U.S. PATENT DOCUMENTS

| | | | |
|---|---|---|---|
| 3,253,358 | 5/1966 | Wright . | |
| 3,661,449 | 5/1972 | Wright | 353/88 |
| 3,807,850 | 4/1974 | Ozeki | 353/DIG. 6 |
| 3,827,797 | 8/1974 | Eaves | 353/122 |
| 4,002,408 | 1/1977 | Amma | 353/70 |
| 4,129,372 | 12/1978 | Allgeier | 355/1 |
| 4,133,605 | 1/1979 | Wiggin | 353/DIG. 5 |
| 4,184,754 | 1/1980 | Ozeki | 353/DIG. 5 |
| 4,338,006 | 7/1982 | Ozeki | 353/85 |
| 4,688,910 | 8/1987 | Deary | 353/88 |
| 4,814,216 | 8/1989 | Brunett et al. | 353/120 |
| 4,906,091 | 3/1990 | Ozeki | 353/27 R |
| 4,989,330 | 2/1991 | Ozeki | 353/DIG. 5 |
| 5,013,148 | 5/1991 | Ozeki | 353/DIG. 3 |

FOREIGN PATENT DOCUMENTS

465125  8/1928  Germany .
0047030  4/1981  Japan .......................... 353/DIG. 3

Primary Examiner—William A. Cuchlinski, Jr.
Assistant Examiner—William C. Dowling
Attorney, Agent, or Firm—Richard C. Litman

[57] ABSTRACT

An apparatus for use in projecting a picture image onto a remote surface includes a frame assembly, a stage assembly, and a support assembly. The frame assembly receives a light source and a light pipe through which light from the light source is transmitted and cooled, the stage assembly supports a plurality of discrete transparencies, and the support assembly supports a projecting lens and a reflecting mirror. The stage assembly includes a stage glass for supporting discrete transparencies. The stage glass is rectilinearly displaceable so as to permit any discrete point of the stage glass to be positioned above a light source.

17 Claims, 6 Drawing Sheets

APPARATUS FOR USE IN PROJECTING A PICTURE IMAGE ONTO A REMOTE SURFACE

BACKGROUND OF THE INVENTION

1. Field of the Invention

The present invention relates generally to an overhead projection apparatus, and more particularly to an apparatus for use in projecting a picture image onto a remote surface.

2. Description of the Prior Art

Photographic transparencies, that is, mounted slides and/or unmounted negatives, are commonly stored in clear vinyl pages. Photographic transparencies may be viewed at actual size with backlighting and may be further viewed under limited enlargement with the aid of a magnifying lens. If greater magnification is desired, or if it is desirable to project a picture image of photographic transparencies on a remote surface, a device, such as a slide viewer or projector, may be employed. This requires the photographic transparencies to be removed from the clear vinyl pages and loaded in the device or in a magazine suitable for use with the device.

An apparatus which would permit an enlargement of photographic transparencies to be easily viewed separately and independently of one another, and without removing the photographic transparencies from the clear vinyl storage page in which the photographic transparencies are stored, would offer convenience as well as reduction in the risk of damaging the photographic transparencies. Devices for enlarging photographic transparencies are well known in the prior art of record. For example, a photographic enlarger is disclosed in U.S. Pat. No. 4,129,372, issued Dec. 12, 1978 to Michael Allgeier. The photographic enlarger includes a housing having a lamp therein which directs light towards a light mixing system. A condensing lens directs light from the light mixing system towards a film slide and further towards a focusing lens located at a forwardmost end of an adjustable bellows. This enlarger is limited in its application to one photographic transparency at a time, and therefore still requires the removal of each photographic transparency to be viewed from the clear vinyl storage page in which the photographic transparencies are stored.

A visual teaching system is disclosed in U.S. Pat. No. 3,253,358, issued May 31, 1966 to John S. Wright, wherein a series of bound transparencies may be viewed individually on an overhead projector. Another patent to John S. Wright, namely, U.S. Pat. No. 3,661,449, issued May 9, 1972, discloses an overhead projector shutter assembly having a frame defining a window and a number of slides movably mounted in the frame to mask the window. The slides are selectively movable to mask and unmask selective portions of the window, or the entire window, to project selective portions of a transparency. Neither the teaching system nor the shutter assembly, as disclosed by Wright above, are applicable in viewing separate photographic transparencies without removing the photographic transparencies from the clear vinyl storage page in which the photographic transparencies are stored.

None of the above inventions and patents, taken either singly or in combination, is seen to describe the instant invention as claimed. More particularly, none of the aforementioned patents is seen to describe an apparatus for producing a picture image of separate and independent photographic transparencies on a remote surface without having to remove the photographic transparencies from a clear vinyl storage page.

SUMMARY OF THE INVENTION

The present invention is an apparatus for use in projecting a picture image onto a remote surface. The apparatus includes a frame assembly, a stage assembly, and a support assembly. The frame assembly receives a light source and a light pipe through which light from the light source is transmitted and cooled. The stage assembly supports a plurality of discrete transparencies. The support assembly supports a projecting lens and a reflecting mirror.

The frame assembly is a generally open structure which may even possess openings in its base for the purpose of exposing the light source. A closure attached to the frame assembly is pivotally displaceable to provide access to the light source contained within the frame assembly. A releasable fastener may secure the closure in a closed position and thereby, prevent unauthorized removal of the light source from the frame assembly. Abutment and stop surfaces are arranged and configured to provide stability for the light source with the frame assembly. A pair of legs are structured to elevate the frame assembly a predetermined distance above a supporting surface so as to expose the base of the frame assembly and thereby provide ventilation for the light source, access to light source controls, and passage for a power cord if desirable. For added stability, feet which make greater surface contact with a supporting surface may support the legs.

The stage assembly is releasably attached to the top of the frame assembly intermediate the light pipe and the projecting lens. Abutment surfaces and a fastening configuration prevent lateral, longitudinal, and vertical displacement of the stage assembly relative to the frame assembly. The stage assembly includes a stage glass for supporting discrete transparencies and is rectilinearly displaceable along a desired axis parallel to a first axis and along a desired axis parallel to a second axis, wherein the first and second axes are coplanar and substantially perpendicular to one another. Any discrete point of the stage glass may be positioned above the light pipe through the proper manipulation of the stage assembly, permitting a picture image of each and every transparency to be independently produced on a remote surface. To assist in the manipulation of the stage assembly, a handle may be provided in a suitable location which may be grasped by a user while viewing transparencies.

A mount for releasably mounting the support assembly to the frame assembly extends from the frame assembly and includes a mortise for slidably receiving the support assembly. The support assembly includes a pole member which is slidably engageable with the mounting assembly. A locking member is provided for releasably retaining the pole member at the desired elevation. The pole member has attached thereto an arm member which, in turn, has attached thereto a support bracket for supporting a projecting lens and a reflecting mirror so as to axially align the projecting lens with the light pipe.

In use, a sheet of discrete transparencies is supported by the stage glass. Light passing through the light pipe passes through a desired transparency, through the projecting lens, and is then reflected off of the reflecting mirror to produce a picture image on a remote surface.

The degree of magnification of the projected image is in part determined according to lens specifications. By pivotally adjusting the reflecting mirror, the elevation of the picture image appearing on the remote surface may be varied as well. Proper focus of the picture image is attained by adjusting the elevation of the pole member.

Accordingly, it is a principal object of the invention to provide an apparatus for use in projecting a picture image of separate and independent photographic transparencies on a remote surface without having to remove the photographic transparencies from a clear vinyl storage page and thereby, save time and reduce the risk of damage to the photographic transparencies.

It is another object that the apparatus have a light source which transmits a light through the light pipe, through a desired photographic transparency, and further through a projecting lens where the light being transmitted is thereafter reflected off of a reflecting mirror to produce a picture image on a remote surface.

It is a further object that the apparatus permit the magnification and the elevation of the picture image to be varied in accordance with the users preference.

Still another object is that the apparatus support a light source and include a closure which is pivotally displaceable to provide access to the light source.

Yet another object is that the apparatus be structured and configured to provide stable support for the light source.

Another object is that the apparatus include a stage glass for supporting discrete transparencies and that the stage glass be structured and configured rectilinearly displaceable along a desired axis parallel to a first axis and along a desired axis parallel to a second axis, wherein the first and second axes are coplanar and substantially perpendicular to one another.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
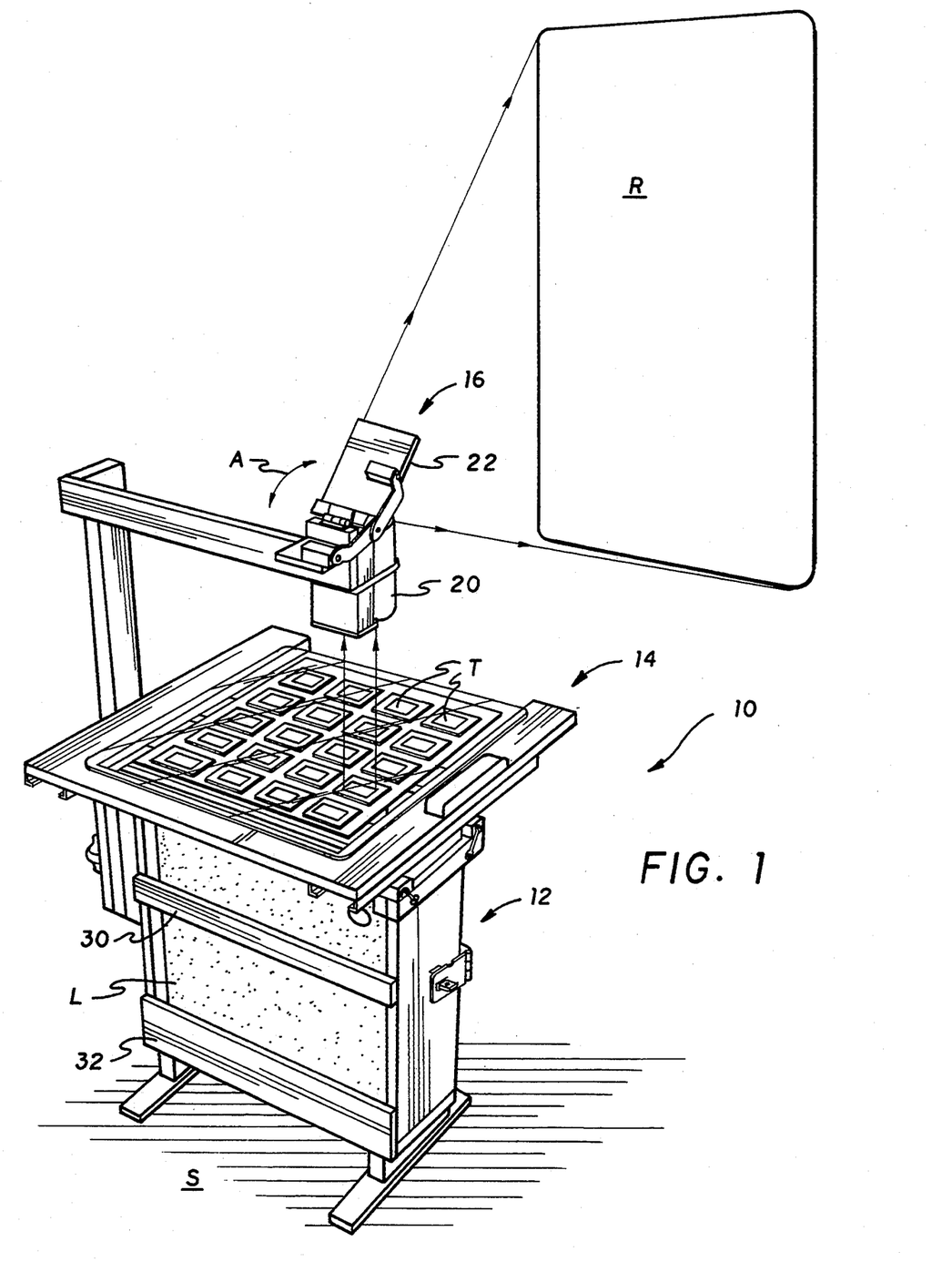
FIG. 1 is an environmental rear perspective view of an apparatus for use in projecting a picture image onto a remote surface.

The present invention, according to FIG. 1, is an apparatus 10 for use in projecting a picture image onto a remote surface R. The apparatus 10 shown generally includes a frame assembly 12, a stage assembly 14, and a support assembly 16. The frame assembly 12 is dimensioned and configured to receive a light source L, such as the slide projector shown, and a light pipe 18 (shown in FIGS. 5 through 7) through which light from the light source L is transmitted and cooled. The stage assembly 14 is intended to support a transparency T and, more particularly a plurality of discrete transparencies, such as the sheet of photograph slides shown. The support assembly 16 is structured to support a projecting lens 20 and a reflecting mirror 22.

Figure 2:
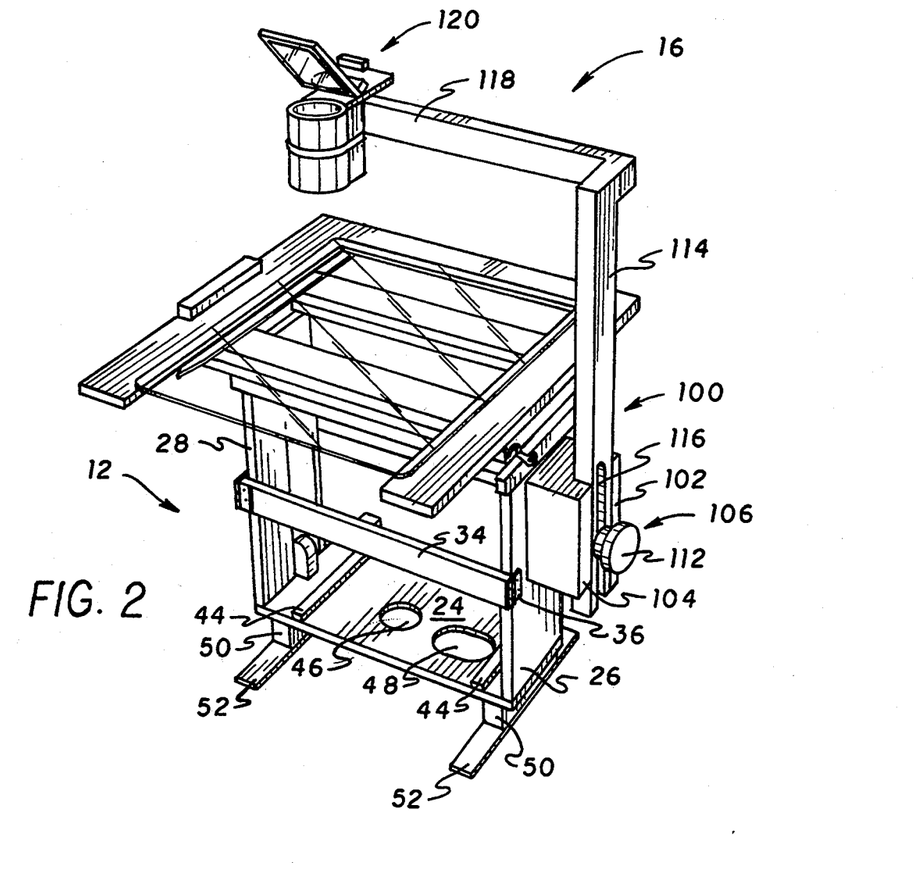
FIG. 2 is a front perspective of the apparatus shown in FIG. 1.

The frame assembly 12 shown in FIG. 2 includes a horizontal base plate 24 structured and configured to support a light source, such as the light source L shown in FIG. 1. Side walls 26, 28 are attached to opposite ends of the base plate 24 so as to extend vertically therefrom. Rearwardly disposed lateral support braces 30, 32 (clearly shown in FIG. 1) are provided to sustain the side walls 26, 28 in a spaced relation relative to one another. A forwardly disposed, laterally extending closure 34 has a first end pivotally attached by a hinge 36 to one side wall 26 and a second end releasably attachable to the other side wall 28.

Figure 3:
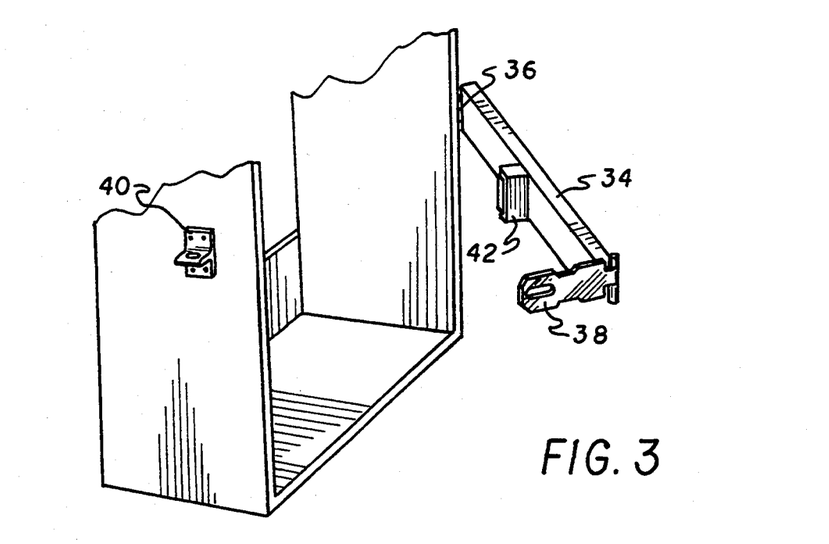
FIG. 3 is an enlarged perspective view of a closure for use in confining a light source within the apparatus.

As clearly shown in FIG. 3, the second end of the closure 34 may be releasably attached by cooperatively engageable hasp and staple elements 38, 40. This enables the closure 34 to be locked in a closed position. The closure 34 is pivotally displaceable to provide access the light source L (shown in FIG. 1) contained within the frame assembly 12 to permit the light source L to be inserted therein and removed therefrom.

Also shown in FIG. 3, is a padded stop 42 extending rearwardly from the closure 34. The stop 42 is dimensioned and configured to prevent longitudinal displacement of the light source L (shown in FIG. 1) within the frame assembly and thereby, provides stability for the light source L in a longitudinal direction.

Referring back to FIG. 2, laterally spaced abutments 44 may be affixed to an upper surface of the base plate 24 so as to prevent lateral displacement of the light source L (shown in FIG. 1) within the frame assembly 12 and thereby, provide stability for the light source L in the lateral direction.

FIG. 2 further shows a plurality of openings 46, 48 in the base plate 24 and a pair of legs 50 extending downward from the base plate 24. The openings 46, 48 are arranged and configured to expose the light source bottom (not shown). The legs 50 are structured to elevate the base plate 24 a predetermined distance above a supporting surface S (shown in FIG. 1) so as to expose the openings 46, 48. It may be desirable that the light source bottom be exposed, for example, to provide ventilation for the light source L, access to light source controls (not shown), and passage for the light source power cord (also not shown). To enhance the stability of the frame assembly 12, the legs 50 may include feet 52 which make greater surface contact with supporting surface S.

Figure 4:
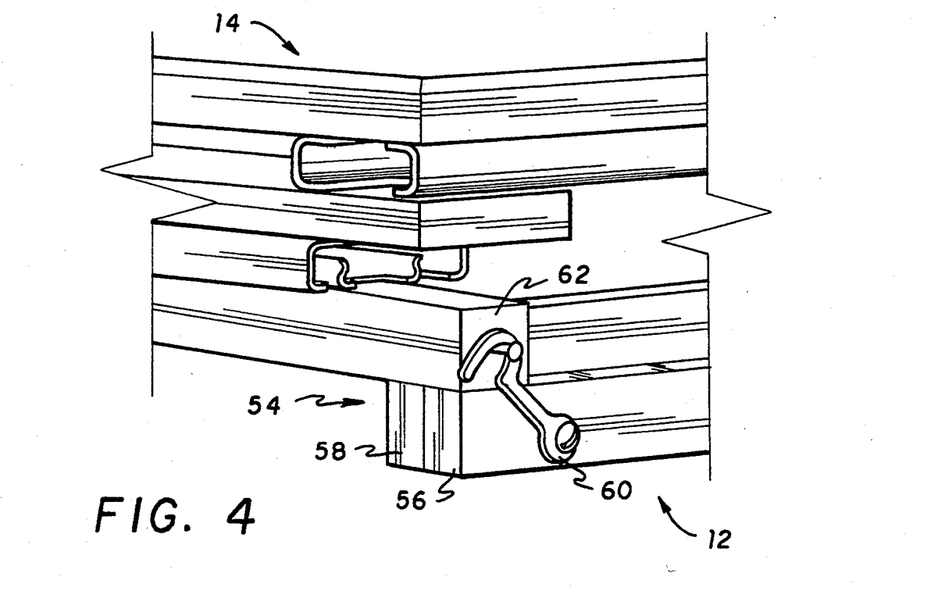
FIG. 4 is an enlarged perspective view of a fastening configuration for use in releasably attaching the stage assembly of the apparatus shown in FIG. 2 to the frame assembly shown.
Figure 5:
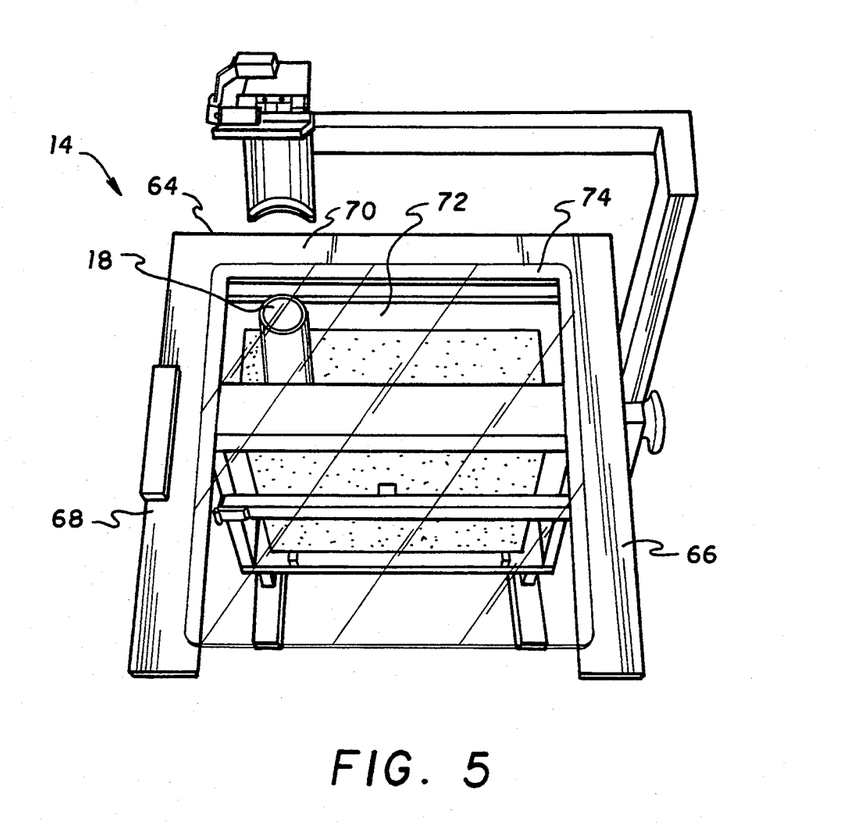
FIG. 5 is a plan view of the apparatus shown in FIG. 1 in an initial position.

The stage assembly 14 is attached to the top of the frame assembly 12 above the light source L and the light pipe 18 (each of which are shown in FIG. 5). This may be accomplished through the use of a fastening configuration such as that shown in FIG. 4. In accordance with this fastening configuration 54, an abutment 56 extends beyond the front and rear surface of each sidewall 26, 28 and a projection 58 extends downwardly from the stage assembly 14 proximate each corner thereof. Each projection 58 engages a respective abutment 56 so as to prevent lateral displacement of the stage assembly 14 relative to the frame assembly 12.

The fastening configuration shown in FIG. 4 further includes a latch element 60 movably attached to the side of each abutment 56 and a latch engaging element 62 extending from the side of each corner of the stage assembly 14. Each latch element 60 is movable to engage a respective latch engaging element 62 so as to prevent longitudinal and vertical displacement of the stage assembly 14 relative to the frame assembly 12.

Now referring to FIG. 5, the stage assembly 14 shown includes a C-shaped structure 64 constructed from two longitudinally extending members 66, 68 joined in a spaced relation by a rearwardly disposed laterally extending member 70. This C-shaped structure 64 is configured to support a stage glass 72, preferably in a recessed fashion. This may be accomplished by providing journal 74 in an upper surface of the C-shaped member 64 about an inner periphery thereof.

Figure 6:
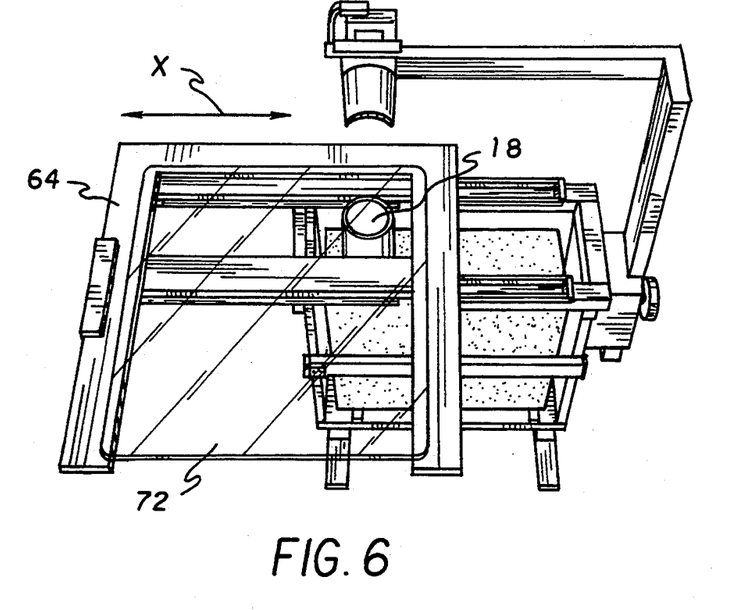
FIG. 6 is a reduced plan view of the apparatus shown in FIG. 5, rectilinearly displaced in an extreme direction along an axis parallel to a first axis.
Figure 7:
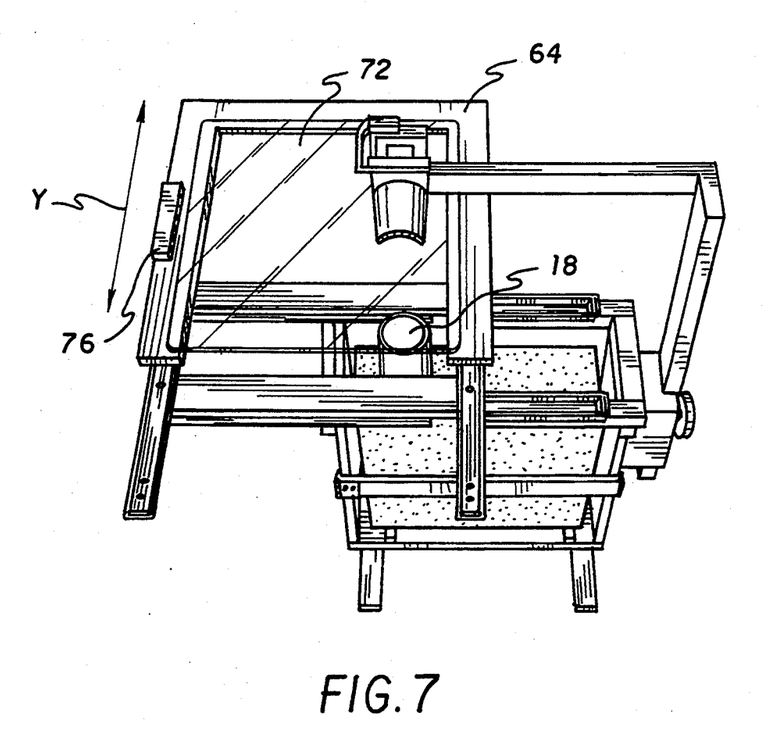
FIG. 7 is a plan view of the apparatus shown in FIG. 6, rectilinearly displaced in an extreme direction along an axis parallel to a second axis.

The C-shaped structure 64, as shown in FIGS. 5, 6 and 7, is rectilinearly displaceable along a desired axis parallel to a first axis X and along a desired axis parallel to a second axis Y, wherein the first and second axes X, Y are coplanar and substantially perpendicular to one another.

With reference to FIG. 5, the C-shaped structure 64 is in an initial position. In this position, the rear right corner of the stage glass 72 will be positioned above the light pipe 18. Light passing through the light pipe 18 will be concentrated only on this portion of the stage glass 72. As light passes through a discrete transparency T, such as that shown in FIG. 1, located at this point of the stage glass 72, a picture image of this transparency may be projected onto a remote surface R (also shown in FIG. 1).

In FIG. 6, the C-shaped structure 64 is shown displaced in an extreme direction along an axis parallel to a first axis X. In this position, the rear left corner of the stage glass 72 will be positioned above the light pipe 18. Light passing through the light pipe 18 will be concentrated only on the rear left corner of the stage glass 72. Light passing through a discrete transparency T (shown in FIG. 1) located at this point of the stage glass 72, will produce a picture image of this transparency on a remote surface R (also shown in FIG. 1).

To produce a picture image of a transparency located at the forward left corner of the C-shaped structure 64, the C-shaped structure 64 may be displaced in an extreme direction along an axis parallel to a second axis Y, as is shown in FIG. 7. In this position, the forward left corner of the stage glass 72 will be positioned above the light pipe 18. Light passing through the light pipe 18 will be concentrated only on a discrete transparency T (shown in FIG. 1) located at this point of the stage glass 72.

It should be noted that the displacement of C-shaped structure 64 is not limited to only these points but may be positioned at any point between these points. Hence, it should be clear that any discrete point of the stage glass 72 may be positioned above the light pipe 18 through the proper manipulation of the C-shaped structure 64, permitting a picture image of each and every transparency T (shown in FIG. 1) to be independently produced on a remote surface R (also shown in FIG. 1). To assist in the manipulation of the C-shaped structure 64, a handle 76 may be provided in a suitable location on the C-shaped structure 64 which may be grasped by a user while viewing transparencies T.

Figure 8:
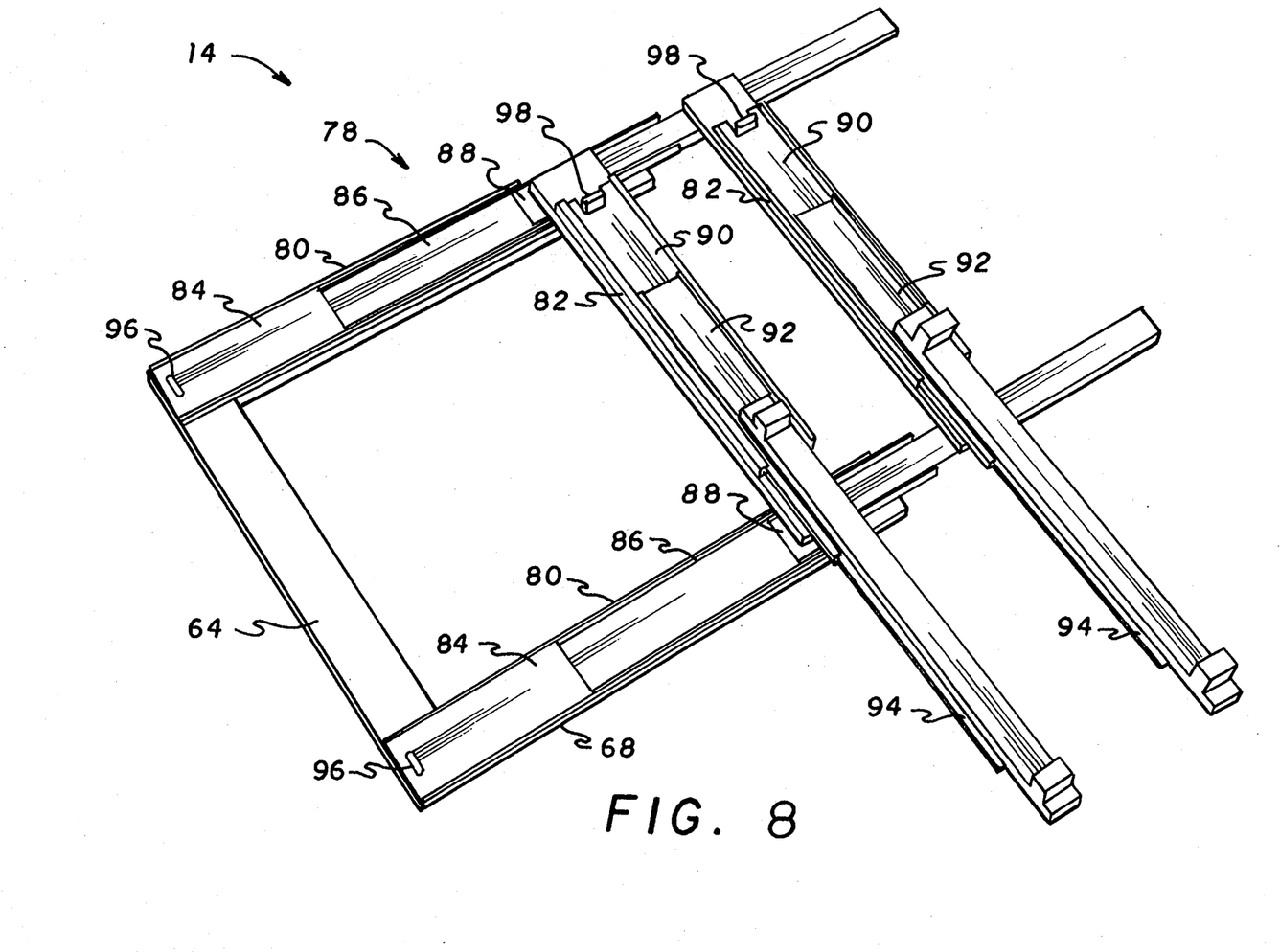
FIG. 8 is an bottom perspective view of a stage assembly according to the present invention.

The displacement of the C-shaped structure 64 may be accomplished through the employment of the rectilinear displacement configuration 78 shown in FIG. 8. This displacement configuration 78 includes a first pair of nestingly engageable elements 80 disposed parallel to one another and a second pair of nestingly engageable elements 82 disposed parallel to one another and normal to the first pair of nestingly engageable elements 80.

Each one of the first pair of nestingly engageable elements 80 includes a longitudinally extending guide element 84 and a first and second longitudinally extending slide element 86, 88. Each of the longitudinally extending guide elements 84 are fixed to the lower surface of a respective one of the longitudinally extending members 66, 68 forming the C-shaped structure 64. The first and second longitudinally extending slide elements 86, 88 are, in turn, received by their respective longitudinally extending guide elements 84 so as to be rectilinearly displaceable relative to each other and relative to their respective longitudinally extending guide elements 84.

Each one of the second pair of nestingly engageable elements 82 includes a laterally extending guide element 90 and a first and second laterally extending slide element 92, 94. The laterally extending guide elements 90 each have opposite ends. A first end of each laterally extending guide element 90 is fixed to a one of the second longitudinally extending slide elements 88 and a second end of each laterally extending guide element 90 is fixed to the other one of the second longitudinally extending slide elements 88. These laterally extending guide elements 90 are arranged so as to be spaced relative to one another and perpendicular to each one of the second longitudinally extending slide elements 88. Each one of the laterally extending guide elements 90, in turn, receive a first and second laterally extending slide element 92, 94 such that each of the first and second laterally extending slide elements 92, 94 are rectilinearly displaceable relative to each other and relative to their respective laterally extending guide element 90.

Further shown in FIG. 8 are abutments 96, 98 intended to limit the rectilinear displacement of the stage assembly 14 in a direction parallel to each axis X, Y (shown in FIGS. 5, 6, and 7). A first set of abutments 96 extends from the longitudinally extending guide elements 84 and a second set of abutments 98 extends from the laterally extending guide elements 90. The abutments 96, 98 are cooperatively engageable with respective slide elements 86, 88 and 92, 94 to restrict the travel of the respective slide elements 86, 88 and 92, 94 relative to the guide elements 84, 90.

Figure 9:
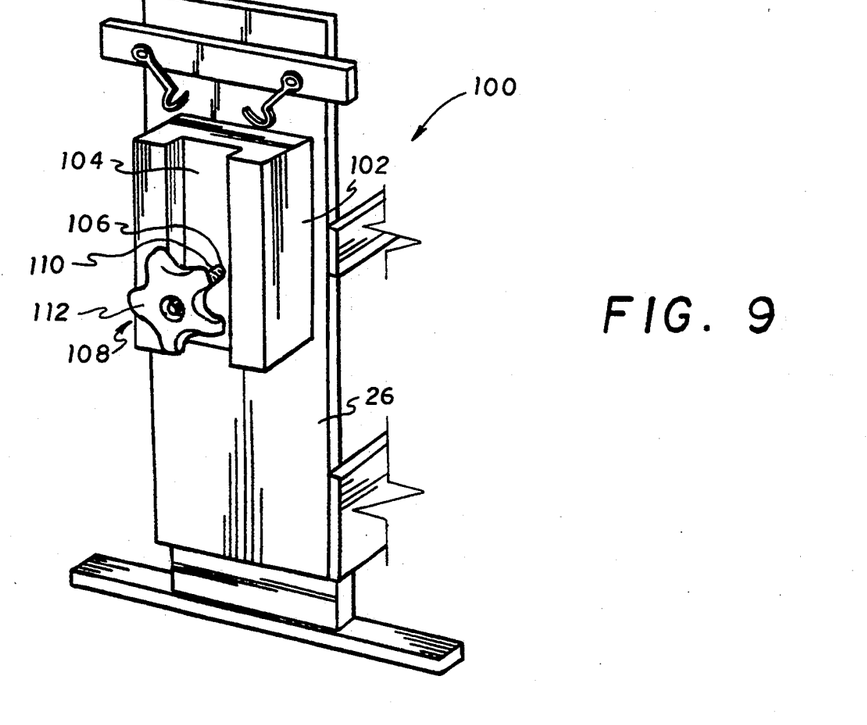
FIG. 9 is an enlarged perspective view of a mount for use in adjustably mounting the support assembly shown.

Now referring to FIG. 9, a mount 100 for releasably mounting the support assembly 16 (shown in FIGS. 1 and 2) to the frame assembly 12 is shown. The mount 100 includes a protuberance 102 extending from an outer surface of the first side wall 26 of the frame assembly 12. The protuberance 102 has a mortise 104 therein for slidably receiving the support assembly 16. A tapped bore 106 is located in the bottom of the mortise 104 for receiving a locking member 108. The locking member 108 includes a externally threaded stud 110 having a first end which is threadably engageable with the tapped bore 106 and a second end having a knob 112 affixed thereto.

Referring back to FIG. 2, the support assembly 16 is shown mounted to the first side 26 of the frame assembly 12 so as to extend vertically upward. The support assembly 16 includes a pole member 114 having a lower end having an elongated, vertically extending slot 116 passing laterally therethrough. The pole member 114 is mounted to the frame assembly 12 by slidably engaging the lower end of the pole member 114 in the mortise 104 provided in the protuberance 102 extending from the outer surface of the first side wall 26 of the frame assembly 12. Upon slidably engaging the pole member 114 with the mortise 104, the slot 116 will receive the externally threaded stud 110 (shown clearly in FIG. 9). With the pole member 114 positioned at the desired elevation, the knob 112 of the locking member 108 may be tightened against the lower end of the pole member 114 which will thereby retain the pole member 114 at the desired elevation. By backing the knob 112 away from the lower end of the pole member 114, the pole member 114 may be raised and lowered to various elevations.

The support assembly 16 shown in FIGS. 1 and 2 further includes an arm member 118 having a first end attached the pole member 114. A second end of the arm member 118 has attached thereto a support bracket 120 for supporting a projecting lens 20 and a reflecting mirror 22. In this particular configuration, the arm member 118 is offset relative to the pole member 114 so as to permit the projecting lens 20 to axially align with the light pipe 18.

Figure 10:
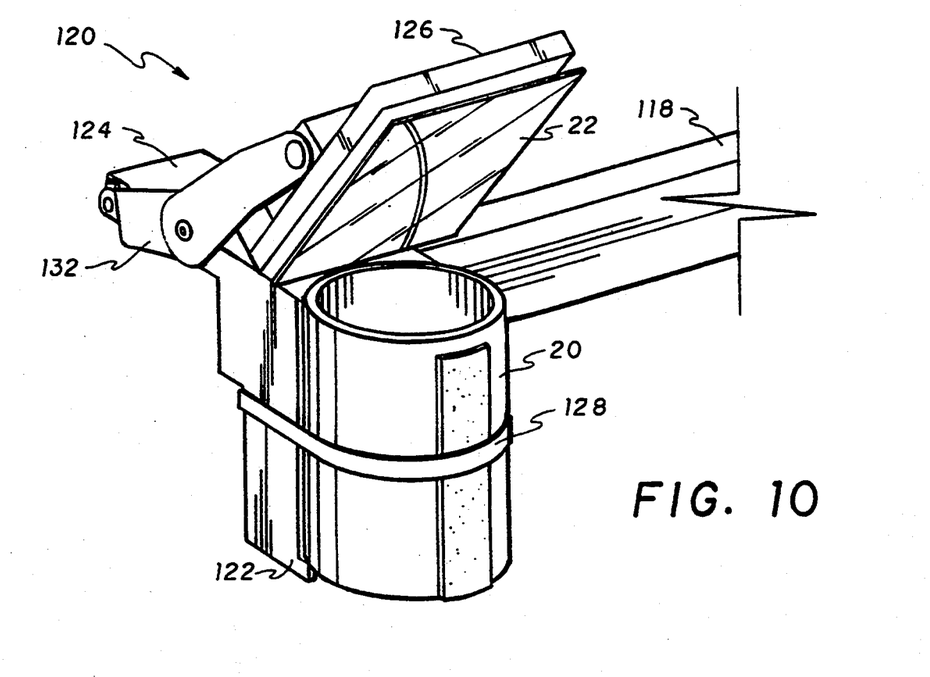
FIG. 10 is an enlarged environmental perspective view of a support bracket for use in supporting a projecting lens and a reflecting mirror.

The support bracket 120 shown in FIG. 10 includes a lens carriage 122, a support plate 124, and a backing plate 126. The lens carriage 122 is attached to the front of the arm member 118 so as to extend downward from the arm member 118. The support plate 124 extends rearwardly from the top of the lens carriage 122 so as to be perpendicular with the lens carriage 122. The backing plate 126 is attached to the top of the support plate 124 opposite the arm member 118 and rearwardly of the lens carriage 122.

A forward surface of the lens carriage 122 is arcuate in shape, as is shown in FIGS. 5, 6, and 7, and complementary to the shape of the outer peripheral surface of the projecting lens 20. The projecting lens 20 is fastened to the lens carriage 122 with a suitable fastener 128. A releasable fastener, such as the elastic band shown, may permit the projecting lens 20 to be removed and replaced with alternative lenses (not shown).

The backing plate 126 is pivotally attached to the support plate 124 with a suitable pivotal element 130, such as the hinge shown in FIG. 2. A forward surface of the backing plate 126 has the reflecting mirror 22 attached thereto. A snubbing hinge 132, such as that clearly shown in FIG. 10, has a first end pivotally connected to the backing plate 126 and a second end pivotally connected to the support plate 124. The pivotal element 130 and the snubbing hinge 132 are arranged such that the pivotal axis of the pivotal element 130 and the pivotal axis of the snubbing hinge 132 coalign. The snubbing hinge 132 is configured to offer resistance to pivotal movement of the backing plate 126 and thereby, retain the reflecting mirror 22 in a desired location relative to the projecting lens 20.

Referring back to FIG. 1, the apparatus 10 is shown in use. The frame assembly 12 has enclosed therein a projector which forms a light source L. The sheet of discrete transparencies T is supported by the stage glass 72. Light passing through the light pipe 18 (clearly shown in FIG. 5) passes through a desired transparency, through the projecting lens 20, and is then reflected off of the reflecting mirror 22 to produce a picture image on a remote surface R. A proper focus of the picture image on the remote surface R is accomplished by vertically adjusting the pole member 114. A movement of the reflecting mirror in the directions A will vary the elevation of the picture image on the remote surface R. The magnification of the picture image is determined according to the optical specification of the projecting lens 20.

It is to be understood that the present invention is not limited to the sole embodiment described above, but encompasses any and all embodiments within the scope of the following claims.

I claim:

1. An apparatus for use with a light source in projecting a picture image of a transparency onto a remote surface, said apparatus comprising:
   a frame assembly dimensioned and configured to support a light source;
   a stage assembly including:
      a stage, and
      means for enabling displacement of said stage;
   first attaching means for attaching said stage assembly to said frame assembly so as to be located above the light source, said stage to being displaceable relative to said frame assembly;
   a support assembly including:
      a projecting lens,
      a reflecting mirror, and
      second attaching means for pivotally attaching said reflecting mirror adjacent said projecting lens; and
   third attaching means for movably attaching said support assembly to said frame assembly such that said projecting lens is positioned above said stage and the light source, said third attaching means including:
      means for releasably locking said support assembly in a fixed position relative to said frame assembly.

2. The apparatus according to claim 1, further including:
   means for transmitting a cooled light from the light source through said stage assembly and into said projecting lens.

3. The apparatus according to claim 2, wherein said light transmitting means includes a light pipe located intermediate the light source and said stage assembly.

4. The apparatus according to claim 3, wherein said light pipe is dimensioned and configured to such that light passing through said light pipe is concentrated on a discrete portion of said stage.

5. The apparatus according to claim 1, further including: a closure, and
   fourth attaching means for releasably attaching said closure to said frame assembly, whereby said closure is detachable to provide access to the light source contained within the frame assembly.

6. The apparatus according to claim 5, wherein said fourth attaching means includes:
a hasp, and
a staple, said hasp being cooperatively engageable with said staple.

7. The apparatus according to claim 1, further including:
a means for preventing longitudinal and lateral displacement of the light source within said frame assembly.

8. The apparatus according to claim 1, wherein said displacement enabling means is structured and configured so as to enable said stage to be rectilinearly displaceable along a desired axis parallel to a first axis and along a desired axis parallel to a second axis, wherein the first and second axes are coplanar and substantially perpendicular to one another.

9. The apparatus according to claim 1, wherein said first attaching means includes:
a latch element,
fifth attaching means for movably attaching said latch element to said frame assembly,
a latch engaging element being cooperatively engageable with said latch element, and
sixth attaching means for fixedly attaching said latch engaging element to said stage assembly.

10. The apparatus according to claim 1, wherein said support assembly further includes:
a carriage, and
seventh attaching means for releasably attaching said projecting lens to said carriage.

11. An apparatus for use with a light source in projecting a picture image of a transparency onto a remote surface, said apparatus comprising:
a frame assembly;
a stage assembly including:
a stage, and
means for enabling displacement of said stage;
first attaching means for attaching said stage assembly to said frame assembly;
a support assembly including:
a projecting lens,
a reflecting mirror, and
second attaching means for attaching said reflecting mirror proximate said projecting lens;
third attaching means for attaching said support assembly to said frame assembly;
a closure; and
fourth attaching means for releasably attaching said closure to said frame assembly.

12. The apparatus according to claim 11, wherein said fourth attaching means includes:
a hasp, and
a staple, said hasp being cooperatively engageable with said staple.

13. An apparatus for use with a light source in projecting a picture image of a transparency onto a remote surface, said apparatus comprising:
a frame assembly;
a light source disposed within said frame assembly;
a stage assembly including:
a stage, and
means for enabling displacement of said stage;
first attaching means for attaching said stage assembly to said frame assembly;
light transmitting means for Conducting light from said light source, said light transmitting means including a light pipe;
a support assembly including:
a projecting lens,
a reflecting mirror, and
second attaching means for attaching said reflecting mirror proximate said projecting lens; and
third attaching means for attaching said support assembly to said frame assembly.

14. The apparatus according to claim 13, wherein said light pipe is dimensioned and configured so as to concentrate light on a discrete portion of said stage.

15. The apparatus according to claim 13, wherein said displacement enabling means is structured and configured so as to enable said stage to be displaceable along a desired axis parallel to a first axis and along a desired axis parallel to a second axis, wherein the first and second axes are coplanar and substantially perpendicular to one another.

16. The apparatus according to claim 13, wherein said first attaching means includes:
a latch element,
fifth attaching means for movably attaching said latch element to said frame assembly,
a latch engaging element, said latch engaging element being cooperatively engageable with said latch element, and
sixth attaching means for fixedly attaching said latch engaging element to said stage assembly.

17. The apparatus according to claim 13, wherein said support assembly further includes:
a carriage, and
seventh attaching means for releasably attaching said projecting lens to said carriage.

* * * * *